US009760832B2

(12) United States Patent
Wang et al.

(10) Patent No.: US 9,760,832 B2
(45) Date of Patent: Sep. 12, 2017

(54) METHOD AND APPARATUS FOR PREDICTING BASED ON MULTI-SOURCE HETEROGENEOUS DATA

(71) Applicant: Baidu Online Network Technology (Beijing) Co., Ltd, Beijing (CN)

(72) Inventors: Qing Wang, Beijing (CN); Wei Hu, Beijing (CN); Zhiyong Shen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 372 days.

(21) Appl. No.: 14/585,136

(22) Filed: Dec. 29, 2014

(65) Prior Publication Data
US 2016/0063383 A1  Mar. 3, 2016

(30) Foreign Application Priority Data
Aug. 27, 2014  (CN) .......................... 2014 1 0427849

(51) Int. Cl.
*G06F 9/44*       (2006.01)
*G06N 7/02*       (2006.01)
(Continued)

(52) U.S. Cl.
CPC .............. *G06N 5/04* (2013.01); *G06F 17/18* (2013.01); *G06N 7/005* (2013.01); *G06Q 50/34* (2013.01); *G07F 17/3288* (2013.01)

(58) Field of Classification Search
USPC ........................................................ 706/52
See application file for complete search history.

(56) References Cited

U.S. PATENT DOCUMENTS 7,299,079 B2 * 11/2007 Rebec ................ A61B 5/14532
                                                    600/310
7,523,094 B1 *  4/2009 Thiemann ......... G06F 17/30457
(Continued)

FOREIGN PATENT DOCUMENTS

CN          104200090 A     12/2014

OTHER PUBLICATIONS

Predicting Seat-Off and Detecting Start-of-Assistance Events for Assisting Sit-to-Stand With an Exoskeleton Kevin Tanghe; Anna Harutyunyan; Erwin Aertbeliën; Friedl De Groote; Joris De Schutter; Peter Vrancx; Ann Nowé IEEE Robotics and Automation Letters Year: 2016, vol. 1, Issue: 2 pp. 792-799, DOI: 10.1109/LRA.2016.2530165 IEEE.*

(Continued)

*Primary Examiner* — Michael B Holmes
(74) *Attorney, Agent, or Firm* — Orrick, Herrington & Sutcliffe, LLP (57) ABSTRACT

A method and apparatus for predicting based on multi-source heterogeneous data. The method comprises: acquiring, with regard to an event of a set type, at least two types of historical data that can reflect an event result; establishing a joint likelihood model of attribute data of the event of the set type and the historical data; determining an optimal estimation of the attribute data according to a maximum posterior principle; and determining, based on a probability distribution associated with the attribute data in the joint likelihood model, a parameter in the probability distribution as a prediction result of a predicted event of the set type. Some embodiments use a hierarchical model to introduce data of different sources into different data layers, unify heterogeneous data in a joint likelihood model to perform analysis, and obtain a more accurate, instant and stable prediction result through effective fusion.

20 Claims, 3 Drawing Sheets

(51) Int. Cl.
*G06N 7/06* (2006.01)
*G06N 5/04* (2006.01)
*G06F 17/18* (2006.01)
*G07F 17/32* (2006.01)
*G06Q 50/34* (2012.01)
*G06N 7/00* (2006.01)

(56) References Cited

U.S. PATENT DOCUMENTS

| | | | | |
|---|---|---|---|---|
| 8,015,202 | B2* | 9/2011 | Bestgen | G06F 17/30442 |
| | | | | 707/718 |
| 8,160,666 | B2* | 4/2012 | Rebec | A61B 5/14532 |
| | | | | 600/310 |
| 8,452,359 | B2* | 5/2013 | Rebec | A61B 5/14532 |
| | | | | 600/310 |
| 8,524,109 | B2* | 9/2013 | Tan | H01L 41/43 |
| | | | | 252/62.9 PZ |
| 9,114,806 | B2* | 8/2015 | Wang | B60W 10/06 |
| 9,189,047 | B2* | 11/2015 | Bestgen | G06F 1/206 |
| 9,371,766 | B2* | 6/2016 | Wang | F01N 9/007 |
| 9,420,516 | B2* | 8/2016 | Guo | H04W 40/12 |
| 9,503,959 | B2* | 11/2016 | Guo | H04W 40/12 |
| 9,554,735 | B2* | 1/2017 | Rebec | A61B 5/14532 |

OTHER PUBLICATIONS

Learning to reproduce stochastic time series using stochastic LSTM Sadaf Gulshad; Dick Sigmund; Jong-Hwan Kim 2017 International Joint Conference on Neural Networks (IJCNN) Year: 2017 pp. 859-866, DOI: 10.1109/IJCNN.2017.7965942 IEEE Conference Publications.*

Improved prediction of the accent gap between speakers of English for individual-based clustering of World Englishes Fumiya Shiozawa; Daisuke Saito; Nobuaki Minematsu 2016 IEEE Spoken Language Technology Workshop (SLT) Year: 2016 pp. 129-135, DOI: 10.1109/SLT.2016.7846255 IEEE Conference Publications.*

Online variational Bayesian Support Vector Regression Siqi Deng; Kan Gao; Changying Du; Wenjing Ma; Guoping Long; Yucheng Li 2016 International Joint Conference on Neural Networks (IJCNN) Year: 2016 pp. 3950-3957, DOI: 10.1109/IJCNN.2016.7727712 IEEE Conference Publications.*

Dixon, M.J., et al., "Modeling Association Football Scores and Inefficiencies in the Football Betting Market," *J. of the Royal Statistical Society: Series C* (*Applied Statistics*), 46(2):265-280 (May 1997).

* cited by examiner

METHOD AND APPARATUS FOR PREDICTING BASED ON MULTI-SOURCE HETEROGENEOUS DATA

CROSS-REFERENCE TO RELATED APPLICATIONS

The present application claims priority to Chinese Patent Application No. CN201410427849.7, filed on Aug. 27, 2014, the entire disclosure of which is incorporated herein by reference in its entirety and for all purposes.

TECHNICAL FIELD

The embodiments of the present invention relate to data processing technology, and in particular, to a method and apparatus for predicting based on multi-source heterogeneous data.

BACKGROUND

In the prior art, a common method of predicting is to predict an event result based on historical data and a model. A typical application scenario is to predict the results of various matches.

A prediction model based on historical match data mainly estimates the offensive/defensive capability of a match team by means of analyzing performances of various teams in historical match data, and predicts a match result of a subsequent match on this basis.

The defect of the technical solution is mainly as follows: due to matches of various match teams being sparsely distributed over time, changes in players of the match team and fluctuations in the players' own states, as well as the chance nature of matches, it is very difficult for a prediction model obtained on this basis to make a good estimate of instantaneous relative strength of all match teams, with the result that the prediction has a poor accuracy and is not stable enough. In addition, conditions occurring in a match schedule cannot be reflected promptly. Moreover, there is only one data source and the information amount is relatively small, and thus a match result of a future match cannot be effectively predicted.

SUMMARY

The embodiments of the present invention provide a method and apparatus for predicting based on multi-source heterogeneous data, so as to improve the accuracy of prediction.

The embodiments of the present invention provide a method for predicting based on multi-source heterogeneous data, comprising:

acquiring, with regard to an event of a set type, at least two types of historical data which can reflect an event result;

establishing a joint likelihood model of attribute data of the event of the set type and the at least two types of historical data, and determining an optimal estimation of the attribute data according to a maximum posterior principle; and determining, with regard to an event to be predicted which belongs to the event of the set type, based on a probability distribution associated with the attribute data in the joint likelihood model, a parameter in the probability distribution as a prediction result of the event to be predicted.

The embodiments of the present invention also provide an apparatus for predicting based on multi-source heterogeneous data, comprising:

a data acquisition module for acquiring, with regard to an event of a set type, at least two types of historical data which can reflect an event result;

a model estimation module for establishing a joint likelihood model of attribute data of the event of the set type and the at least two types of historical data, and determining an optimal estimation of the attribute data according to a maximum posterior principle; and a result prediction module for determining, with regard to an event to be predicted which is of the set type, based on a probability distribution associated with the attribute data in the joint likelihood model, a parameter in the probability distribution as a prediction result of the event to be predicted.

The embodiments of the present invention use a hierarchical model to introduce data of different sources into different data layers, unify heterogeneous data in a joint likelihood model to perform analysis, and obtain a more accurate, instant and stable prediction result through effective fusion.

DETAILED DESCRIPTION OF THE PREFERRED EMBODIMENTS

The present invention will be further described in detail below in conjunction with the accompanying drawings and the embodiments. It can be understood that specific embodiments described herein are merely used for explaining the present invention, rather than limiting the present invention. Additionally, it also needs to be noted that, for ease of description, the accompanying drawings only show parts related to the present invention rather than all the structures.

Embodiment I

Figure 1:
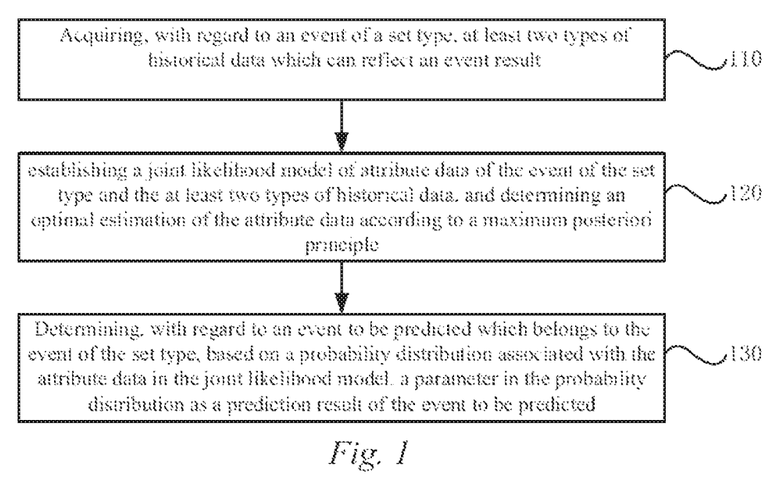
FIG. 1 is a flowchart of a method for predicting based on multi-source heterogeneous data provided by embodiment I of the present invention.

FIG. 1 is a flowchart of a method for predicting based on multi-source heterogeneous data proposed by embodiment I of the present invention. The embodiment of the present invention is applicable to the prediction of the result of an event, specifically comprising the following:

S110, with regard to an event of a set type, at least two types of historical data which can reflect an event result are acquired.

The event of the set type refers to an event which can be predicted by the method of the embodiment of the present invention and is generally an event of which an event result satisfies a certain probability distribution, typically such as a football match and a basketball match. The historical data refers to historical result data of such events. The event result may usually be expressed from multiple perspectives, and result data of each perspective may be viewed as being of one type. For example, with regard to a football match, score data may be viewed as a type of data which can reflect a match result, and viewed from the different perspectives of a home team and a visiting team, the score may be denoted as a home team score and a visiting team score; and odds data may be viewed as another type of data which can reflect the match result, wherein the odds data is generally acquired from organizations such as sports lotteries and often embodies an expected value for the match result of bettors and organizers, and the odds data may comprise home odds, average odds and visiting odds. Multiple types of historical data actually constitute a multi-source heterogeneous data form, unlike the prior art which is limited to a certain single data source type.

S120, a joint likelihood model of attribute data of the event of the set type and the at least two types of historical data is established, and an optimal estimation of the attribute data is determined according to a maximum posterior principle.

The attribute data refers to an intrinsic attribute of the event. Although it may contain some accidental factors, the attribute data is generally static and stable. For example, a match team offensive/defensive capability parameter of the match may be viewed as the attribute data, and although the performance level of a match team may be effected by weather, illness and injuries, it should be stable in general, and is also an important basis for predicting a match result. The present operation establishes a joint likelihood model of the attribute data and at least two types of historical data of the event, that is, multi-source heterogeneous historical data is comprehensively taken into consideration to determine the attribute data of the event from multiple levels.

The operation may specifically be: establishing the joint likelihood model according to a relationship between the at least two types of historical data and the attribute data and a correction function for correcting the relationship to satisfy a normal distribution.

The joint likelihood model comprehensively takes the relationships between various types of historical data and the attribute data into consideration, and the relationship between each type of historical data and the attribute data may be expressed by means of a certain distribution probability function. The relationship between the historical data and the attribute data preferably comprises a Poisson distribution function and/or a gamma distribution function. For example, the relationship between the odds and the offensive/defensive capability parameter may be expressed based on the Poisson distribution function, and the relationship between the score and the offensive/defensive capability parameter may be expressed based on the gamma distribution function. Of course, the distribution probability functions are not limited to these and may also be expressed using other distribution probability functions which satisfy the event relationships.

On this basis, it is preferred that the joint likelihood model further comprises a correction function for correcting the relationship to satisfy a normal distribution, that is, since relationships in the attribute data and between the attribute data and the match result generally satisfy a normal relationship, and extreme cases are unlikely to occur, with regard to abnormal relationships resulting from certain accidental factors or insufficient historical data, excessively large deviation of the determined attribute data is avoided.

S130, with regard to an event to be predicted which is of the set type, based on a probability distribution associated with the attribute data in the joint likelihood model, a parameter in the probability distribution is determined as a prediction result of the event to be predicted.

After the attribute data of the event of the set type is determined, with regard to events of the same type, this attribute data may be used, and based on a probability distribution associated with the attribute data in the joint likelihood model, a parameter in the probability distribution is determined. This is actually a reverse process of determining attribute data based on historical data.

The embodiments of the present invention use a hierarchical model to introduce data of different sources into different data layers, unify heterogeneous data in a joint likelihood model to perform analysis, and obtain a more accurate, instant and stable prediction result through effective fusion.

Embodiment II

Figure 2:
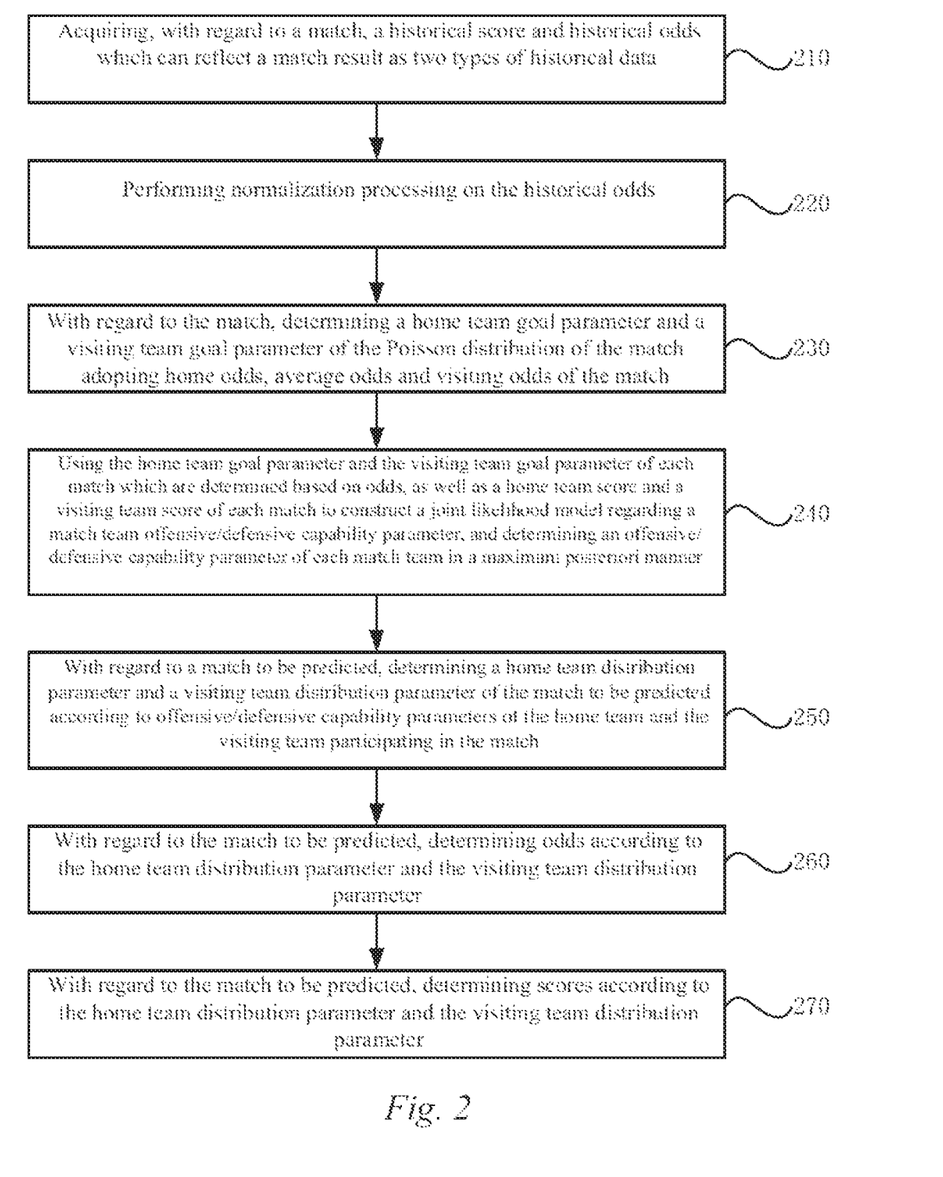
FIG. 2 is a flowchart of a method for predicting based on multi-source heterogeneous data provided by embodiment II of the present invention.
Figure 3:
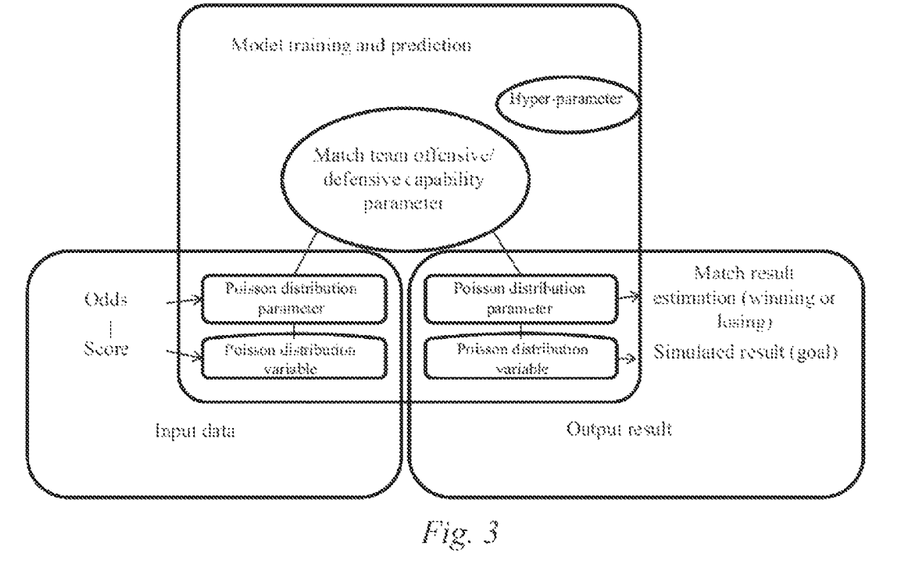
FIG. 3 is a schematic diagram illustrating a relationship between a model and a parameter applicable to embodiment II of the present invention.

FIG. 2 is a flowchart of a method for predicting based on multi-source heterogeneous data provided by embodiment II of the present invention; and FIG. 3 is a schematic diagram illustrating a relationship between a model and a parameter applicable to embodiment II of the present invention. This embodiment provides a specific solution for execution, and the description is provided with match prediction as an example specifically. The method specifically comprises:

S210, with regard to a match, a historical score and historical odds which can reflect a match result are acquired as two types of historical data;

The present operation takes historical results of multiple matches, wherein each of the multiple matches may be denoted as match m, m being the sequence number of the match and the value range of m being 1 to M. The score of each match m is denoted as a home team score $s_{m,1}$ and a visiting team score $s_{m,2}$; and odds of each match m are denoted as home odds $P_{m,1}$, average odds $P_{m,2}$ and visiting odds $P_{m,3}$.

S220, normalization processing is performed on the historical odds.

The present operation is an optional step, to adapt the odds to a parameter form of a distribution probability function. It is preferred that the normalization processing may be performed on the odds based on a formula as follows:

$$P'_{m,1}=P_{m,1}/(P_{m,1}+P_{m,2}+P_{m,3}) \quad (1)$$

$$P'_{m,2}=P_{m,2}/(P_{m,1}+P_{m,2}+P_{m,3}) \quad (2)$$

$$P'_{m,3}=P_{m,3}/(P_{m,1}+P_{m,2}+P_{m,3}) \quad (3)$$

$P'_{m,1}$, $P'_{m,2}$, and $P'_{m,3}$ are odds after normalization processing, and for uniform description hereinafter, the odds after normalization processing are still denoted as $P_{m,1}$, $P_{m,2}$, and $P_{m,3}$.

S230, with regard to a match m, a home team goal parameter $\lambda_{m,1}$ and a visiting team goal parameter $\lambda_{m,2}$ of the Poisson distribution of the match m are determined using home odds $P_{m,1}$, average odds $P_{m,2}$ and visiting odds $P_{m,3}$ of the match m based on a relational expression as follows:

$$\begin{cases} p_{m,1} = P(Poisson(\lambda_{m,1}) > Poisson(\lambda_{m,2})) \\ p_{m,2} = P(Poisson(\lambda_{m,1}) = Poisson(\lambda_{m,2})) \\ p_{m,3} = P(Poisson(\lambda_{m,1}) < Poisson(\lambda_{m,2})) \end{cases} \quad (4)$$

where P( ) is a distribution probability, namely, a probability which satisfies the relational expression in the brackets.

Poisson($\lambda$) denotes a Poisson distribution with $\lambda$ as a parameter, and it means that if a random variable X is only valued as a non-negative integer 0, 1, 2, . . . , and the probability distribution thereof obeys Poisson($\lambda$). Then the meaning of $P_{m,1}$=P(Poisson($\lambda_{m,1}$)>Poisson($\lambda_{m,2}$)) is that the values of the home team goal parameter $\lambda_{m,1}$ and the visiting team goal parameter $\lambda_{m,2}$ are such that the probability of Poisson($\lambda_{m,1}$)>Poisson($\lambda_{m,2}$) is equal to the home odds $P_{m,1}$. The meanings of the other two formulas are similar, and the home team goal parameter $\lambda_{m,1}$ and the visiting team goal parameter $\lambda_{m,2}$ should satisfy the above-mentioned three relational expressions.

The home team goal parameters $\lambda_{m,1}$ and the visiting team goal parameters $\lambda_{m,2}$ of various matches are all determined according to the above relational expressions. The matches per se are different, for example, the weather, date, importance of the match, score and odds are different, and therefore even if the match teams participating in the matches are the same, the determined home team goal parameters $\lambda_{m,1}$ and visiting team goal parameters $\lambda_{m,2}$ are not exactly the same. The home team goal parameter $\lambda_{m,1}$ and the visiting team goal parameter $\lambda_{m,2}$ of each match team determined by participating in the matches are independent of one another.

S240, a home team goal parameter $\lambda_{m,1}$ and a visiting team goal parameter $\lambda_{m,2}$ of each match which are determined based on odds, as well as a home team score $s_{m,2}$ and a visiting team score $s_{m,2}$ of each match are substituted into the following formula to construct a joint likelihood model as follows regarding a match team offensive/defensive capability parameter $\theta$, and an offensive/defensive capability parameter $\theta$ of each match team is determined in a maximum posterior manner:

$$\log P(\theta) = g \log P(s|\theta) + (1-g)\log P(\lambda|\theta) + \log N(\theta; 0, \sigma_1^2) + \log N(\alpha_i - d_j; 0, \sigma_2^2) \quad (5)$$

where $$\theta = (\{\alpha_i\}_{i=1\ldots n}, \{d_j\}_{j=1\ldots n}, \{b_k, b_{k'}\}_{k,k'=1\ldots k})$$

$\theta$ is an offensive/defensive capability parameter set of each match team. n is the sequence number of a match team, $\alpha_i$ is an offensive capability parameter of a match team i, $d_j$ is a defensive capability parameter of a match team j, and $b_k$ and $b_{k'}$ are state adjustment parameters of the match which are respectively used for correcting, according to the state of a match, an offensive capability parameter and a defensive capability parameter of a match team when serving as a home team and a visiting team. The so-called state adjustment parameter is a correction coefficient for adjusting the offensive/defensive capability parameter of a match team according to the state of the match. Because even if the match teams participating in the match are the same, the offensive/defensive capability may also change due to the natural state of the match. For example, the weather conditions during the match, whether the type of the match is a friendly match or World Cup, a league match, etc., and thus $b_k$ may be set as a correction coefficient for the offensive/defensive capability of the home team, and $b_{k'}$ may be set as a correction coefficient for the offensive/defensive capability of the visiting team, both of which can be obtained through estimation from the model.

P($\theta$) has the meaning of a distribution probability of $\theta$, i.e. denotes the probability density of—as a continuously distributed random variable.

The first item in the relational expression (5) is as follows:

$$P(s|\theta) = \int_0^\infty P(s|\lambda)P(\lambda|\theta)d\lambda$$

$$= \int_0^\infty \frac{\lambda^s}{s!}e^{-\lambda}\frac{\beta^{\exp(x)}}{\Gamma(\exp(x))}\lambda^{\exp(x)-1}\exp(-\beta\lambda)d\lambda$$

$$= \frac{\Gamma(\exp(x)+s)}{\Gamma(\exp(x))}\frac{\beta^{\exp(x)}}{(\beta+1)^{\exp(x)+s}}\frac{1}{s!}$$

$$\int_0^\infty \frac{(\beta+1)^{\exp(x)+s}}{\Gamma(\exp(x)+s)}\lambda^{\exp(x)+s-1}\exp(-(\beta+1)\lambda)d\lambda$$

$$= \frac{\Gamma(\exp(x)+s)}{\Gamma(\exp(x))} \cdot \frac{\beta^{\exp(x)}}{(\beta+1)^{\exp(x)+s}} \cdot \frac{1}{s!}$$

When the value of s is $s_{m,1}$, $x = b_{k_m} + \alpha_{i_m} - d_{j_m}$;
when the value of s is $s_{m,2}$, $x = b_{k'_m} + \alpha_{j_m} - d_{i_m}$;
P(s|$\theta$) is used for denoting the relationship between the offensive/defensive capability parameter $\theta$ and the score s.

The second item in the relational expression (5) is as follows:

$$P(\lambda|\theta) = \frac{\beta^{\exp(x)}}{\Gamma(\exp(x))} \cdot \lambda^{\exp(x)-1} \cdot \exp(-\beta\lambda)$$

When the value of $\lambda$ is $\lambda_{m,1}$, $x = b_{k_m} + \alpha_{i_m} - d_{j_m}$;
when the value of $\lambda$ is $\lambda_{m,2}$, $x = b_{k'_m} + \alpha_{j_m} - d_{i_m}$;
P($\lambda$|$\theta$) is used for denoting the relationship between the offensive/defensive capability parameter $\theta$ and a goal parameter $\lambda$.

g is a preset weight value, and the influence of the score and odds on the offensive/defensive capability parameter may be adjusted by adjusting the weight value; $\beta$ is a preset first preset adjustment parameter value, $\sigma_1$ is a preset second adjustment parameter value, and $\sigma_2$ is a preset third adjustment parameter value; and the above-mentioned parameter values may all be preset according to experience or experiments and may also be adjusted according to prediction conditions.

$\Gamma(\ )$ is a gamma function; and log N( ) function is a logarithmic normal distribution function.

The third item in the relational expression (5) is as follows:

log N ($\theta$; 0, $\sigma_1^2$) is used for correcting a match team with historical data lower than a set threshold value, i.e. when there is relatively little historical data of the match team, in order to avoid the case where the determined match team offensive/defensive capability has a large deviation due to there being little sample data, this adjustment item is set, because the offensive/defensive capability of the match team generally satisfies the normal distribution and will not show excessively large fluctuation in various matches.

The fourth item in the relational expression (5) is as follows:

log N ($\alpha_i - d_i$; 0, $\sigma_2^2$) is used for correcting the balance of offensive/defensive capability of a match team. That is, as regards each match team, there will be no great difference between the offensive and defensive capabilities thereof which are generally associated, and therefore this adjustment item is used for correction.

Based on the adjustment item, that is, through adjusting a model hyper-parameter, the balance of the model between using historical data and odds data may also be controlled, and a ratio of importance degrees of distant data to instant data may be controlled.

S250, with regard to a match c to be predicted, a home team distribution parameter $\lambda_{c,1}$ and a visiting team distribution parameter $\lambda_{c,2}$ of the match c to be predicted are determined according to offensive/defensive capability parameters θ of a home team i and a visiting team j participating in the match based on relational expressions as follows:

$$\lambda_{c,1} \sim \text{Gamma}(\exp(b_{k_c} + \alpha_{i_c} - d_{j_c}), \beta) \quad (6)$$

$$\lambda_{c,2} \sim \text{Gamma}(\exp(b_{k'_c} + \alpha_{j_c} - d_{i_c}), \beta) \quad (7)$$

where $b_{k_c}$ is a home team correction coefficient determined according to the match c to be predicted, $\alpha_{i_c}$ is an offensive capability parameter of the home team i, $d_{j_c}$ is a defensive capability parameter of the visiting team j, $b_{k'_c}$ is a visiting team correction coefficient determined according to the match c to be predicted, $\alpha_{j_c}$ is an offensive capability parameter of the visiting team j, and is $d_{i_c}$ defensive capability parameter of the home team.

S260, with regard to the match c to be predicted, odds $P_{c,1}$, $P_{c,2}$ and $P_{c,3}$ are determined according to the home team distribution parameter $\lambda_{c,1}$ and the visiting team distribution parameter $\lambda_{c,2}$ based on relational expressions as follows:

$$\begin{cases} p_{c,1} = P(\text{Poisson}(\lambda_{c,1}) > \text{Poisson}(\lambda_{c,2})) \\ p_{c,2} = P(\text{Poisson}(\lambda_{c,1}) = \text{Poisson}(\lambda_{c,2})) \\ p_{c,3} = P(\text{Poisson}(\lambda_{c,1}) < \text{Poisson}(\lambda_{c,2})) \end{cases} \quad (8)$$

S270, with regard to the match c to be predicted, scores $S_{c,1}$ and $S_{c,2}$ are determined according to the home team distribution parameter $\lambda_{c,1}$ and the visiting team distribution parameter $\lambda_{c,2}$ based on a relational expression as follows:

$$S_{c,1} \sim \text{Poisson}(\lambda_{c,1}) \quad (9)$$

$$S_{c,2} \sim \text{Poisson}(\lambda_{c,2}) \quad (10)$$

The technical solution of the embodiments of the present invention performs modeling analysis on the offensive/defensive capability parameter of a match team, and performs simulated calculation of possible match results of future matches on this basis. With regard to a match result of each match, two Poisson distributions are used to perform modeling, and a model relationship from scores to Poisson distribution parameters and a model relationship from odds to the Poisson distribution parameters are established in sequence; furthermore, the offensive/defensive capability parameter is used to perform modeling on the distribution of the Poisson distribution parameters; two types of data are integrated using a model having a (deep) hierarchical structure; and finally, probability estimations of possible results of future matches and other outputs are provided according to model results. The distribution of scores is depicted using two Poisson distributions, and meanwhile, parameter values of the Poisson model of the distribution of scores are calculated backward from odds data; a gamma distribution is used to depict the distribution of Poisson model parameter values; and the gamma distribution parameters are associated with the offensive/defensive capability parameters of the home and visiting match teams and other features; Poisson distribution parameters obtained from two aspects are synthesized to establish a joint likelihood of the offensive/defensive capability of the team with match results and odds data.

The technical solution of the embodiment of the present invention may effectively utilize data of different structures from different sources, and with respect to the prior art, a majority of the existing football prediction models only consider using historical score data, without any multi-source data fusion content. However, in the embodiment of the present invention, through integrating multi-source heterogeneous data, the solution can obtain better accuracy, quicker time-effectiveness and superior stability.

Embodiment III

Figure 4:
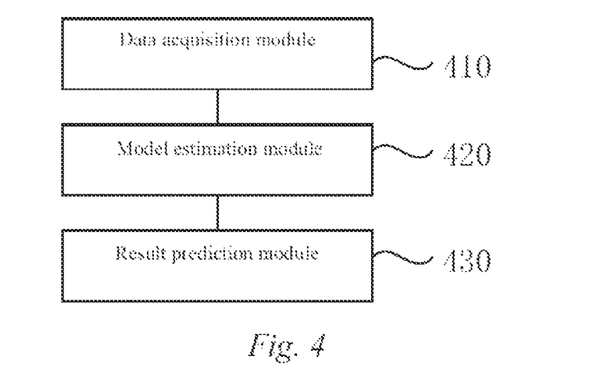
FIG. 4 is a structural schematic diagram of an apparatus for predicting based on multi-source heterogeneous data provided by embodiment III of the present invention.

FIG. 4 is a structural schematic diagram of an apparatus for predicting based on multi-source heterogeneous data provided by embodiment III of the present invention. The apparatus comprises: a data acquisition module 410, a model estimation module 420 and a result prediction module 430. The data acquisition module 410 is used for acquiring, with regard to an event of a set type, at least two types of historical data which can reflect an event result; the model estimation module 420 is used for establishing a joint likelihood model of attribute data of the event of the set type and the at least two types of historical data, and determining an optimal estimation of the attribute data according to a maximum posterior principle; and the result prediction module 430 is used for determining, with regard to an event to be predicted which is of the set type, based on a probability distribution associated with the attribute data in the joint likelihood model, a parameter in the probability distribution as a prediction result of the event to be predicted.

In the above-mentioned technical solution, the model estimation module 420 is specifically used for: establishing the joint likelihood model according to a relationship between the at least two types of historical data and the attribute data and a correction function for correcting the relationship to satisfy a normal distribution.

The relationship between the historical data and the attribute data preferably comprises a Poisson distribution function and/or a gamma distribution function.

A preferred example provided based on the above-mentioned technical solution is:

the data acquisition module 410 is specifically used for acquiring, with regard to a match, a historical score and historical odds which can reflect a match result as two types of historical data;

the model estimation module 420 is specifically used for:

with regard to a match m, determining a home team goal parameter $\lambda_{m,1}$ and a visiting team goal parameter $\lambda_{m,2}$ of the Poisson distribution of the match m using home odds $P_{m,1}$, average odds $P_{m,2}$ and visiting odds $P_{m,3}$ of the match m based on a relational expression as follows:

$$\begin{cases} p_{m,1} = P(\text{Poisson}(\lambda_{m,1}) > \text{Poisson}(\lambda_{m,2})) \\ p_{m,2} = P(\text{Poisson}(\lambda_{m,1}) - \text{Poisson}(\lambda_{m,2})) \\ p_{m,3} = P(\text{Poisson}(\lambda_{m,1}) < \text{Poisson}(\lambda_{m,2})) \end{cases}$$

where P( ) is a distribution probability; m is the sequence number of the match, and the value range of m is 1 to M;

substituting a home team goal parameter $\lambda_{m,1}$ and a visiting team goal parameter $\lambda_{m,2}$ of each match which are determined based on odds, as well as a home team score $s_{m,1}$ and a visiting team score $s_{m,2}$ of each match into the following formula to construct a joint likelihood model as follows regarding a match team offensive/defensive capability parameter θ, and determining an offensive/defensive capability parameter θ of each match team in a maximum posterior manner:

$$\log P(\theta) = g \log P(s|\theta) + (1-g) \log P(\lambda|\theta) + \log N(\theta; 0, \sigma_1^2) + \log N(\alpha_i - d_i; 0, \sigma_2^2)$$

where $\theta = (\{\alpha_i\}_{i=1\ldots n}, \{d_j\}_{j=1\ldots n}, \{b_k, b_{k'}\}_{k,k'=1\ldots K})$ n is the sequence number of a match team, $\alpha_i$ is an offensive capability parameter of a match team i, $d_j$ is a defensive capability parameter of a match team j, and $b_k$ and $b_{k'}$ are state adjustment parameters of the match which are respectively used for correcting, according to the state of a match, an offensive capability parameter and a defensive capability parameter of a match team when serving as a home team and a visiting team;

the meaning of $P(\theta)$ is a distribution probability of $\theta$;

$$P(s \mid \theta) = \frac{\Gamma(\exp(x)+s)}{\Gamma(\exp(x))} \cdot \frac{\beta^{\exp(x)}}{(\beta+1)^{\exp(x)+s}} \cdot \frac{1}{s!}$$

When the value of s is $S_{m,1}$, $x = b_{k_m} + \alpha_{i_m} - d_{j_m}$;
when the value of s is $S_{m,2}$, $x = b_{k'_m} + \alpha_{j_m} - d_{i_m}$;

$$P(\lambda \mid \theta) = \frac{\beta^{\exp(x)}}{\Gamma(\exp(x))} \cdot \lambda^{\exp(x)-1} \cdot \exp(-\beta\lambda)$$

When the value of $\lambda$ is $\lambda_{m,1}$, $x = b_{k_m} + \alpha_{i_m} - d_{j_m}$;
when the value $\lambda$ of is $\lambda_{m2}$, $x = b_{k'_m} + \alpha_{j_m} - d_{i_m}$;

g is a preset weight value, $\beta$ is a preset first preset adjustment parameter value, $\sigma_1$ is a preset second adjustment parameter value, and $\sigma_2$ is a preset third adjustment parameter value;

$\Gamma(\ )$ is a gamma function;

log N ( ) function is a logarithmic normal distribution function;

log $N(\theta; 0, \sigma_1^2)$ is used for correcting a match team with historical data lower than a set threshold value; and log $N(\alpha_i - d_i; 0, \sigma_2^2)$ is used for correcting the balance of offensive/defensive capability of a match team.

The result prediction module 430 is specifically used for:

with regard to a match c to be predicted, determining a home team distribution parameter $\lambda_{c,1}$ and a visiting team distribution parameter $\lambda_{c,2}$ of the match c to be predicted according to offensive/defensive capability parameters $\theta$ of a home team i and a visiting team j participating in the match based on relational expressions as follows:

$\lambda_{c,1}$~Gamma$(\exp(b_{k_c} + \alpha_{i_c} - d_{j_c}), \beta)$ $\lambda_{c,2}$~Gamma$(\exp(b_{k'_c} + \alpha_{j_c} - d_{i_c}), \beta)$ where $b_{k_c}$ is a home team correction coefficient determined according to the match c to be predicted, $\alpha_{i_c}$ is an offensive capability of the home team i, $d_{j_c}$ is a defensive capability of the visiting team j, $b_{k'_c}$ is a visiting team correction coefficient determined according to the match c to be predicted, $\alpha_{j_c}$ is an offensive capability of the visiting team j, and $d_{i_c}$ is a defensive capability of the home team;

with regard to the match c to be predicted, determining odds $P_{c,1}$, $P_{c,2}$ and $P_{c,3}$ according to the home team distribution parameter $\lambda_{c,1}$ and the visiting team distribution parameter $\lambda_{c,2}$ based on a relational expression as follows:

$$\begin{cases} p_{c,1} = P(\text{Poisson}(\lambda_{c,1}) > \text{Poisson}(\lambda_{c,2})) \\ p_{c,2} = P(\text{Poisson}(\lambda_{c,1}) = \text{Poisson}(\lambda_{c,2})) \\ p_{c,3} = P(\text{Poisson}(\lambda_{c,1}) < \text{Poisson}(\lambda_{c,2})) \end{cases}$$

with regard to the match c to be predicted, determining scores $S_{c,1}$ and $S_{c,2}$ according to the home team distribution parameter $\lambda_{c,1}$ and the visiting team distribution parameter $\lambda_{c,2}$ based on relational expressions as follows:

$S_{c,1}$~Poisson$(\lambda_{c1})$ $S_{c,2}$~Poisson$(\lambda_{c2})$.

The model estimation module 430 is also specifically used for performing normalization processing on the historical odds after acquiring, with regard to a match, a historical score and historical odds which can reflect a match result as two types of historical data.

The apparatus for predicting based on multi-source heterogeneous data provided by the embodiments of the present invention is used for carrying out the method for predicting based on multi-source heterogeneous data provided by the embodiments of the present invention, can carry out corresponding operations and has corresponding functions and beneficial effects.

It should be noted that the above are merely preferred embodiments and applied technical principles of the present invention. Those of skill in the art will understand that the present invention is not limited to the particular embodiments described herein, and for those of skill in the art, various obvious modifications, readjustments and substitutions can be carried out without deviating from the scope of protection of the present invention. Therefore, although the present invention is described in detail through the above embodiments, the present invention is not merely limited to the above embodiments; other equivalent embodiments may also be included without deviating from the concept of the present invention, and the scope of the present invention is determined by the scope of the appended claims.

What is claimed is:

1. A computer-implemented method for event predicting via machine learning based on multi-source heterogeneous data, comprising:
   acquiring at least two types of historical data associated with an event result for a first event of a predetermined type;
   establishing a joint likelihood model of attribute data of the first event and the at least two types of historical data;
   determining an optimal estimation of the attribute data based on the joint likelihood model according to a maximum posterior principle; and
   determining a parameter in a probability distribution as a prediction result of a second event based on the probability distribution associated with the attribute data in the joint likelihood model, wherein the joint likelihood model includes one or more adjustment parameters for correcting the joint likelihood model, the adjustment parameters being determined iteratively based on an accuracy of the prediction result.

2. The method of claim 1, wherein said determining the parameter comprises determining the parameter in the probability distribution as the prediction result of an event to be predicted based on the probability distribution.

3. The method of claim 2, wherein a preselected type of the second event and the predetermined type of the first event are identical.

4. The method of claim 1, wherein said establishing comprises establishing the joint likelihood model according to a relationship between the at least two types of historical data and the attribute data and a correction function for correcting the relationship to satisfy a normal distribution.

5. The method of claim 4, wherein the relationship between the at least two types of historical data and the attribute data comprises a Poisson distribution function.

6. The method of claim 4, wherein the relationship between the at least two types of historical data and the attribute data comprises a gamma distribution function.

7. The method of claim 1, wherein the one or more adjustment parameters include one or more state adjustment parameters, a preset weight value, a first preset adjustment parameter value, a second preset adjustment parameter value, a third preset adjustment parameter value, or a combination thereof, the method further comprising:

acquiring, with regard to a match, a historical score and historical odds that can reflect a match result as the two types of historical data;

with regard to a match m, determining a home team goal parameter $\lambda_{m,1}$ and a visiting team goal parameter $\lambda_{m2}$ of a Poisson distribution of the match m using home odds $p_{m,1}$, average odds $p_{m,2}$ and visiting odds $p_{m,3}$ of the match m based on a relational expression as follows:

$$\begin{cases} p_{m,1} = P(\text{Poisson}(\lambda_{m,1}) > \text{Poisson}(\lambda_{m,2})) \\ p_{m,2} = P(\text{Poisson}(\lambda_{m,1}) = \text{Poisson}(\lambda_{m,2})) \\ p_{m,3} = P(\text{Poisson}(\lambda_{m,1}) < \text{Poisson}(\lambda_{m,2})) \end{cases}$$

wherein P( ) is a distribution probability; m is the sequence number of the match, and the value range of m is 1 to M; and substituting the home team goal parameter $\lambda_{m,1}$ and the visiting team goal parameter $\lambda_{m,2}$ of each match that are determined based on odds, as well as a home team score $s_{m,1}$ and a visiting team score $s_{m,2}$ of each match into the following formula to construct a joint likelihood model as follows regarding a match team offensive/defensive capability parameter $\theta$, and determining an offensive/defensive capability parameter $\theta$ of each match team in a maximum posterior manner:

$\log P(\theta) = g \log P(s|\theta) + (1-g) \log P(\lambda|\theta) + \log N(\theta; 0, \sigma_1^2) + \log N(\alpha_i - d_i; 0, \sigma_2^2)$ wherein $\theta = (\{\alpha_i\}_{i=1 \ldots n}, \{d_j\}_{j=1 \ldots n}, \{b_k, b_{k'}\}_{k,k'=1 \ldots k})$ n is a sequence number of a match team, $\alpha_i$ is an offensive capability parameter of a match team i, $d_j$ is a defensive capability parameter of a match team j, and $b_k$ and $b_{k'}$ are the state adjustment parameters of the match that are respectively used for correcting, according to the state of a match, an offensive capability parameter and a defensive capability parameter of a match team when serving as a home team and a visiting team;

$P(\theta)$ is a distribution probability of $\theta$;

$$P(s|\theta) = \frac{\Gamma(\exp(x) + s)}{\Gamma(\exp(x))} \cdot \frac{\beta^{\exp(x)}}{(\beta+1)^{\exp(x)+s}} \cdot \frac{1}{s!}$$

wherein the value of s is $s_{m,1}$, $x = b_{k_m} + \alpha_{i_m} - d_{j_m}$;
wherein the value of s is $s_{m,2}$, $x = b_{k'_m} + \alpha_{j_m} - d_{i_m}$;

$$P(\lambda|\theta) = \frac{\beta^{\exp(x)}}{\Gamma(\exp(x))} \cdot \lambda^{\exp(x)-1} \cdot \exp(-\beta\lambda)$$

wherein the value of $\lambda$ is $\lambda_{m,1}$, $x = b_{k_m} + \alpha_{i_m} - d_{j_m}$; and
wherein the value of $\lambda$ is $\lambda_{m,2}$, $x = b_{k'_m} + \alpha_{j_m} - d_{i_m}$;

wherein g is the preset weight value, $\beta$ is the preset first preset adjustment parameter value, $\sigma_1$ is the preset second adjustment parameter value, and $\sigma_2$ is the preset third adjustment parameter value;

$\Gamma( )$ is a gamma function;

logN( ) function is a logarithmic normal distribution function;

$\log N(\theta; 0, \sigma_1^2)$ is used for correcting a match team with historical data lower than a set threshold value; and $\log N(\alpha_i - d_i; 0, \sigma_2^2)$ is used for correcting the balance of the offensive/defensive capability of a match team.

8. The method of claim 7, wherein said determining the parameter in the probability distribution comprises:

with regard to a match c to be predicted, determining a home team distribution parameter $\lambda_{c,1}$ and a visiting team distribution parameter $\lambda_{c,2}$ of the match c to be predicted according to offensive/defensive capability parameters $\theta$ of a home team i and a visiting team j participating in the match based on relational expressions as follows:

$\lambda_{c,1} \sim \text{Gamma}(\exp(b_{k_c} + \alpha_{i_c} - d_{j_c}), \beta)$ $\lambda_{c,2} \sim \text{Gamma}(\exp(b_{k'_c} + \alpha_{j_c} - d_{i_c}), \beta)$ where $b_{k_c}$ is a home team correction coefficient determined according to the match c to be predicted, $\alpha_{i_c}$ is an offensive capability parameter of the home team i, $d_{j_c}$ is a defensive capability parameter of the visiting team j, $b_{k'_c}$ is a visiting team correction coefficient determined according to the match c to be predicted, $\alpha_{j_c}$ is an offensive capability parameter of the visiting team j, and $d_{i_c}$ is a defensive capability parameter of the home team;

with regard to the match c to be predicted, determining odds $p_{c,1}$, $p_{c,2}$ and $p_{c,3}$ according to the home team distribution parameter $\lambda_{c,1}$ and visiting team distribution parameter $\lambda_{c,2}$ based on a relational expression as follows:

$$\begin{cases} p_{c,1} = P(\text{Poisson}(\lambda_{c,1}) > \text{Poisson}(\lambda_{c,2})) \\ p_{c,2} = P(\text{Poisson}(\lambda_{c,1}) = \text{Poisson}(\lambda_{c,2})) \\ p_{c,3} = P(\text{Poisson}(\lambda_{c,1}) < \text{Poisson}(\lambda_{c,2})) \end{cases};$$

and with regard to the match c to be predicted, determining scores and $S_{c,1}$ and $S_{c,2}$ according to the home team distribution parameter $\lambda_{c,1}$ and visiting team distribution parameter $\lambda_{c,2}$ based on relational expressions as follows:

$s_{c,1} \sim \text{Poisson}(\lambda_{c,1})$ $s_{c,2} \sim \text{Poisson}(\lambda_{c,2})$.

9. The method of claim 7, further comprising performing normalization processing on the historical odds.

10. The method of claim 9, wherein said performing the normalization processing occurs after said after acquiring, with regard to the match, the historical score and historical odds.

11. An apparatus for event predicting via machine learning based on multi-source heterogeneous data, comprising:
a processor; and a memory having one or more programs stored thereon for instructing said processor, the one or more programs including:

instruction for acquiring, with regard to an event of a set type, at least two types of historical data that can reflect an event result;

instruction for establishing a joint likelihood model of attribute data of the event of the set type and the at least two types of historical data and determining an optimal estimation of the attribute data based on the joint likelihood model according to a maximum posterior principle; and instruction for determining, with regard to an event to be predicted which is of the set type, based on a probability distribution associated with the attribute data in the joint likelihood model, a parameter in the probability distribution as a prediction result of the event to be predicted, wherein the joint likelihood model includes one or more adjustment parameters for correcting the joint likelihood model, the adjustment parameters being determined iteratively based on an accuracy of the prediction result.

12. The apparatus of claim 11, wherein the one or more programs include instruction for establishing the joint likelihood model according to a relationship between the at least two types of historical data and the attribute data and a correction function for correcting the relationship to satisfy a normal distribution.

13. The apparatus of claim 12, wherein the relationship between the historical data and the attribute data comprises a Poisson distribution function.

14. The apparatus of claim 12, wherein the relationship between the historical data and the attribute data comprises a gamma distribution function.

15. The apparatus of claim 11, wherein the one or more adjustment parameters include one or more state adjustment parameters, a preset weight value, a first preset adjustment parameter value, a second preset adjustment parameter value, a third preset adjustment parameter value, or a combination thereof, wherein the one or more programs include:

instruction for acquiring, with regard to a match, a historical score and historical odds which can reflect a match result as two types of historical data;

instruction for:

with regard to a match m, determining a home team goal parameter $\lambda_{m,1}$ and a visiting team goal parameter $\lambda_{m,2}$ of the Poisson distribution of said match m using home odds $p_{m,1}$, average odds $p_{m,2}$ and visiting odds $p_{m,3}$ of said match m based on a relational expression as follows:

$$\begin{cases} p_{m,1} = P(\text{Poisson}(\lambda_{m,1}) > \text{Poisson}(\lambda_{m,2})) \\ p_{m,2} = P(\text{Poisson}(\lambda_{m,1}) = \text{Poisson}(\lambda_{m,2})) \\ p_{m,3} = P(\text{Poisson}(\lambda_{m,1}) < \text{Poisson}(\lambda_{m,2})) \end{cases}$$

where P( ) is a distribution probability; m is a sequence number of the match, and a value range of m is 1 to M; and instruction for substituting the home team goal parameter $\lambda_{m,1}$ and the visiting team goal parameter $\lambda_{m,2}$ of each match which are determined based on odds, as well as a home team score $s_{m,1}$ and a visiting team score $s_{m,2}$ of each match into the following formula to construct a joint likelihood model as follows regarding a match team offensive/defensive capability parameter θ, and determining an offensive/defensive capability parameter θ of each match team in a maximum posterior manner:

$$\log P(\theta) = g \log P(s|\theta) + (1-g)\log P(\theta|\theta) + \log N(\theta; 0, \sigma_1^2) + \log N(\alpha_i - d_i; 0, \sigma_2^2)$$

where $$\theta = (\{\alpha_i\}_{i=1\ldots n}, \{d_j\}_{j=1\ldots n}, \{b_k, b_{k'}\}_{k,k'=1\ldots k})$$

n is the sequence number of a match team, $\alpha_i$ is an offensive capability parameter of a match team i, $d_j$ is a defensive capability parameter of a match team j, and $b_k$ and $b_{k'}$ are the state adjustment parameters of the match which are respectively used for correcting, according to the state of a match, an offensive capability parameter and a defensive capability parameter of a match team when serving as a home team and a visiting team;

P(θ) is a distribution probability of θ;

$$P(s | \theta) = \frac{\Gamma(\exp(x) + s)}{\Gamma(\exp(x))} \cdot \frac{\beta^{\exp(x)}}{(\beta+1)^{\exp(x)+s}} \cdot \frac{1}{s!}$$

when the value of s is $s_{m,1}$, $x = b_{k_m} + \alpha_{i_m} - d_{j_m}$;
when the value of s is $s_{m,2}$, $x = b_{k'_m} + \alpha_{j_m} - d_{i_m}$;

$$P(\lambda | \theta) = \frac{\beta^{\exp(x)}}{\Gamma(\exp(x))} \cdot \lambda^{\exp(x)-1} \cdot \exp(-\beta\lambda)$$

when the value of λ is $\lambda_{m,1}$, $x = b_{k_m} + \alpha_{i_m} - d_{j_m}$;
when the value of λ is $\lambda_{m,2}$, $x = b_{k'_m} + \alpha_{j_m} - d_{i_m}$;

g is the preset weight value, β is the preset first preset adjustment parameter value, $\sigma_1$ is the preset second adjustment parameter value, and $\sigma_2$ is the preset third adjustment parameter value;

Γ( ) is a gamma function;

logN( ) function is a logarithmic normal distribution function;

logN(θ; 0, $\sigma_1^2$) is used for correcting a match team with historical data lower than a set threshold value; and logN($\alpha_i - d_i$; 0, $\sigma_2^2$) is used for correcting the balance of the offensive/defensive capability of a match team.

16. The apparatus of claim 14, wherein the one or more programs include:

instruction for, with regard to a match c to be predicted, determining a home team distribution parameter $\lambda_{c,1}$ and a visiting team distribution parameter $\lambda_{c,2}$ of said match c to be predicted according to offensive/defensive capability parameters θ of a home team i and a visiting team j participating in the match based on relational expressions as follows:

$$\theta_{c,1} \sim \text{Gamma}(\exp(b_{k_c} + \alpha_{i_c} - d_{j_c}), \beta)$$

$$\theta_{c,2} \sim \text{Gamma}(\exp(b_{k'_c} + \alpha_{j_c} - d_{i_c}), \beta)$$

where $b_{k_c}$ is a home team correction coefficient determined according to said match c to be predicted, $\alpha_{i_c}$ is an offensive capability of the home team i, $d_{j_c}$ is a defensive capability of the visiting team j, $b_{k'_c}$ is a visiting team correction coefficient determined according to said match c to be predicted, $\alpha_{j_c}$ is an offensive capability of the visiting team j, and $d_{i_c}$ is a defensive capability of the home team;

instruction for, with regard to the match c to be predicted, determining odds $p_{c,1}$, $p_{c,2}$ and $p_{c,3}$ according to said home team distribution parameter $\lambda_{c,1}$ and visiting team distribution parameter $\lambda_{c,2}$ based on a relational expression as follows:

$$\begin{cases} p_{c,1} = P(\text{Poisson}(\lambda_{c,1}) > \text{Poisson}(\lambda_{c,2})) \\ p_{c,2} = P(\text{Poisson}(\lambda_{c,1}) = \text{Poisson}(\lambda_{c,2})) \\ p_{c,3} = P(\text{Poisson}(\lambda_{c,1}) < \text{Poisson}(\lambda_{c,2})) \end{cases};$$

and instruction for, with regard to the match c to be predicted, determining scores $s_{c,1}$ and $s_{c,2}$ according to said home team distribution parameter $\lambda_{c,1}$ and visiting team distribution parameter $\lambda_{c,2}$ based on relational expressions as follows:

$$s_{c,1} \sim \text{Poisson}(\lambda_{c,1})$$

$$s_{c,2} \sim \text{Poisson}(\lambda_{c,2}).$$

17. The apparatus of claim 14, wherein the one or more programs include instruction for performing normalization processing on the historical odds after acquiring, with regard to a match, a historical score and historical odds which can reflect a match result as two types of historical data.

18. A non-transitory computer storage medium including at least one program for event predicting via machine learning based on multi-source heterogeneous data when implemented by a processor, comprising:

instruction for acquiring at least two types of historical data associated with an event result for a first event of a predetermined type;

instruction for establishing a joint likelihood model of attribute data of the first event and the at least two types of historical data;

instruction for determining an optimal estimation of the attribute data based on the joint likelihood model according to a maximum posterior principle; and instruction for determining a parameter in a probability distribution as a prediction result of a second event based on the probability distribution associated with the attribute data in the joint likelihood model, the second event to be predicted based on the probability distribution and having a preselected type of the second event that is identical to the predetermined type of the first event, wherein the joint likelihood model includes one or more adjustment parameters for correcting the joint likelihood model, the adjustment parameters being determined iteratively based on an accuracy of the prediction result.

19. The computer storage medium of claim 18, wherein said instruction for establishing comprises instruction for establishing the joint likelihood model according to a relationship between the at least two types of historical data and the attribute data and a correction function for correcting the relationship to satisfy a normal distribution.

20. The computer storage medium of claim 19, wherein the relationship between the at least two types of historical data and the attribute data comprises at least one of a Poisson distribution function and a gamma distribution function.

* * * * *